United States Patent
Sakoda et al.

(10) Patent No.: US 6,230,022 B1
(45) Date of Patent: May 8, 2001

(54) TRANSMITTING METHOD AND APPARATUS, AND SENDING POWER CONTROLLING METHOD

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/219,844

(22) Filed: Dec. 23, 1998

(30) Foreign Application Priority Data

Dec. 27, 1997 (JP) .................................................. 9-367733

(51) Int. Cl.$^7$ ...................................................... H04B 7/00
(52) U.S. Cl. .............................. 455/522; 455/63; 455/69; 455/126; 455/127; 455/450; 455/464; 455/509; 455/513
(58) Field of Search ..................................... 455/522, 13.4, 455/63, 69, 115, 116, 126, 127, 450, 464, 509, 513; 370/210

(56) References Cited

U.S. PATENT DOCUMENTS

| | | | |
|---|---|---|---|
| 5,579,306 | * 11/1996 | Dent | 370/330 |
| 5,832,387 | * 11/1998 | Bae et al. | 455/522 |
| 5,956,638 | * 9/1999 | Chang et al. | 455/423 |
| 6,061,568 | * 5/2000 | Dent | 455/450 |
| 6,067,446 | * 5/2000 | Persson et al. | 455/69 |

* cited by examiner

Primary Examiner—Curtis Kuntz
Assistant Examiner—Barry W Taylor
(74) Attorney, Agent, or Firm—Jay H. Maioli

(57) ABSTRACT

In a transmitting method, it is possible to avoid influences of adjacent-channel interference to perform communication satisfactorily. In the case of performing transmission with a previously set sending power, the transmission is performed with the set sending power with respect to a channel having the largest sending power. With respect to a channel having the next largest sending power, if its adjacent channel is the determined channel, the transmission is performed such that the sending power is corrected on the basis of the sending power of the determined channel. Thereby, it is possible to prevent the signal-to-interference wave power ratio C/I of the channel from deteriorating due to the leakage signal (interference wave) from the adjacent channel. Thus, it is possible to avoid the influences of adjacent-channel interference to thereby perform communication satisfactorily.

40 Claims, 13 Drawing Sheets

A MIXTURE OF INFORMATION ON CHANNELS A,B,C,D,···

CHANNELb  CHANNELa  CHANNELd     CHANNELc

TRANSMITTING METHOD AND APPARATUS, AND SENDING POWER CONTROLLING METHOD

BACKGROUND OF THE INVENTION

1. Field of the Invention

This invention relates to a transmitting method and apparatus, a sending power controlling method, and more particularly, suitably applied to a cellular radio communication system.

2. Description of the Related Art

In a cellular radio communication system, areas for offering communication service are divided into cells that have the desired size; a transmitting apparatus is placed in each cell as a fixed station. A communication terminal unit, that is a mobile station, will communicate with such a transmitting apparatus that is in the best status to communicate.

By the way, such a cellular radio communication system, when the desired communication is to be performed, may have the case where the transmission must be performed with a large sending power and the case where the lower sending power is enough to communicate, depending on the position of the mobile station. Therefore, in the cellular radio communication system, a transmitting apparatus and a communication terminal unit are monitoring a received power of each other, and they mutually notify power controlling information based on the result of the monitoring, so as to form a feedback loop and to perform sending-power controlling wherein the communication is achieved with the minimum sending power that is needed. Thus, the cellular radio communication system makes it possible to communicate efficiently with the minimum sending power and to reduce the consumption power in comparison with the case of fixed-power communication, so that such an effect can be obtained that the life time of the battery of a communication terminal unit can be elongated.

In such the cellular radio communication system, it is able to suppress excess sending power by performing transmission on the basis of the power controlling information that is informed from the partner of the communication, however, it is not able to maintain communication continuously by merely controlling the sending power on the basis of the power controlling information.

For instance, it is supposed that a transmitting apparatus 1 is communicating with communication terminal units 2A to 2D existing within the base station's own cell, wherein the transmitting apparatus 1 is communicating with the communication terminal unit 2A using a down channel f1, communicating with the communication terminal unit 2B using a down channel f2, communicating with the communication terminal unit 2C using a down channel f3, and communicating with the communication terminal unit 2D using a down channel f5, as shown in FIG. 1. Besides, it is assumed that the communication terminal units 2A, 2C and 2D are relatively distant from the transmitting apparatus 1, and the communication terminal unit 2B is relatively near to the transmitting apparatus 1.

If sending power controlling is performed under such a situation, the transmitting apparatus 1 transmits transmission signals having relatively large sending power to the communication terminal units 2A, 2C and 2D, and transmits a transmission signal having relatively small sending power to the communication terminal unit 2B. This is because the signal power that are received by the communication terminal units 2A, 2C and 2D are diminished relatively, since signal loss on the transmission line is in proportion to the distance. Therefore, under such a situation, the communication terminal units 2A, 2C and 2D notify the power controlling information of increasing the sending power to the transmitting apparatus 1; as a result, the transmitting apparatus 1 performs transmission to the communication terminal units 2A, 2C and 2D, with a relatively large sending power.

FIG. 2 shows the situation of the sending power of this instance. As shown in the FIG. 2, the transmitting apparatus 1 transmits the transmission signals S1, S3 and S5 of the down channels f1, f3 and f5 that are used for communication with the communication terminal units 2A, 2C and 2D with the large sending power, and transmits the transmission signal S2 of the down channel f2 that is used for communication with the communication terminal unit 2B with the small sending power.

By the way, when a transmission signal is transmitted from a transmitting apparatus 1, usually, the transmission signal is filtered to limit its band width, so that the signal is not transmitted to other channels than the allocated channel. For instance, the band of the transmission signal S1, which is transmitted through the down channel f1, is limited such that it falls within the band of the channel f1. However, it is not possible to completely limit the band by the filter in practice, and some signal components that leak into the adjacent channels exist. This leakage of signal components into adjacent channels is an unavoidable problem, because it is difficult to manufacture a filter that is able to completely cut off such out-of-band signal components.

In fact, in the situation shown in FIG. 2, the transmission signal S1 that is transmitted through the down channel f1 is leaking, in part, into the adjacent channels f0 and f2, and the transmission signal S3 that is transmitted through the down channel f3 is also leaking, in part, into the adjacent channels f2 and f4. If the adjacent channels are not being used or the electric power of the transmission signals that are transmitted through the adjacent channels are large, the signal components that leak into the adjacent channels offer no problem; however, if the power of the transmission signals that are transmitted through the adjacent channels are small, the leaked signal components come into question, because the leaked signal components work as interference waves.

The good example is the channel f2 shown in FIG. 2. When the sending power of a transmission signal S2 is small as the channel f2, the transmission signal S2 is buried in the signal components that have been leaked from the adjacent channels f1 and f3; as a result, although the transmission is being performed with the sending power that has been required from the reception side, the signal-to-interference power ratio C/I deteriorates, and it becomes difficult to perform communication satisfactorily.

In this way, even if transmission is performed with the sending power required from the partner of the communication, it is sometimes difficult to maintain the communication satisfactorily because of the influences of the adjacent-channel interference; thus, the conventional transmission power controlling is yet unsatisfactory.

SUMMARY OF THE INVENTION

In view of the foregoing, an object of this invention is to provide a transmitting method, a sending-power controlling method and a transmitting apparatus that uses the methods for avoiding influences of adjacent-channel interference in advance to favorably communicate.

In the transmitting method for forming plural channels in the frequency direction and for transmitting transmission signals on the plural channels with the previously set sending power, with respect to a channel having the largest sending power for the transmission signals among the plural channels, the sending power is determined to the previously set sending power to perform transmission, and with respect to a channel having the next larger sending power for the transmission signals, if the determined channel having the sending power determined exists adjacent to the channel, the previously set sending power is corrected on the basis of the sending power of the determined channel to perform transmission. In addition, in the transmitting method, with respect to a channel having the largest sending power for the transmission signal among the plural channels, the sending power is determined to the previously set sending power to perform transmission, and with respect to channels adjacent to the determined channel having the sending power determined, the previously set sending power is corrected on the basis of the sending power of the determined channel.

Further, in the transmitting method for forming plural channels in the frequency direction and for transmitting transmission signals based on multi-carriers, on the plural channels with the previously set sending power, the sending power is determined to the previously set sending power to perform transmission with respect to a channel having the largest sending power for the transmission signals among the plural channels, and with respect to a channel having the next larger sending power for the transmission signals, if the determined channel having the sending power determined exists adjacent to the channel, the previously set sending power is corrected on the basis of the sending power of the determined channel to perform transmission. In addition, in the transmitting method, with respect to a channel having the largest sending power for the transmission signals among the plural channels, the sending power is determined to the previously set sending power to perform transmission, and with respect to channels adjacent to the determined channel having the sending power determined, the previously set sending power is corrected on the basis of the sending power of the determined channel to perform transmission.

Further, in the transmitting method for forming plural channels in the frequency direction and for transmitting transmission signals based on time division, on the plural channels with the previously set sending power, the sending power is determined to the previously set sending power to perform transmission with respect to a channel having the largest sending power for the transmission signals among the plural channels, and with respect to a channel having the next larger sending power for the transmission signal, if the determined channel having the sending power determined exists adjacent to the channel, the previously set sending power is corrected on the basis of the sending power of the determined channel to perform transmission. In addition, in the transmitting method, with respect to a channel having the largest sending power for the transmission signals among the plural channels, the sending power is determined to the previously set sending power to perform transmission, and with respect to channels adjacent to the determined channel having the sending power determined, the previously set sending power is corrected on the basis of the sending power of the determined channel to perform transmission.

Furthermore, in the sending power controlling method in a transmitting apparatus for forming plural channels in the frequency direction and for transmitting transmission signals on the plural channels with sending power set on the basis of power controlling data delivered from communication terminal units, with respect to a channel having the largest sending power for the transmission signals among the plural channels, the sending power is determined to the sending power set, and with respect to a channel having the next larger sending power for the transmission signals, if the determined channel having the sending power determined exists adjacent to the channel, the sending power set is corrected on the basis of the sending power of the determined channel. In addition, in the sending power controlling method, with respect to a channel having the largest sending power for the transmission signals among the plural channels, the sending power is determined to the sending power set, and with respect to channels adjacent to the determined channel having the sending power determined, the set sending power is corrected on the basis of the sending power of the determined channel.

Furthermore, in the transmitting apparatus for forming plural channels in the frequency direction and for transmitting transmission signals on the plural channels with sending power set on the basis of power controlling data delivered from communication terminal units, the transmitting apparatus comprises: receiving means for receiving the power controlling data delivered from the communication terminal units; controlling means for setting the sending power of the transmission signals on the basis of the power controlling data; transmitting means for transmitting the transmission signals; and power correcting means for determining the sending power to the set sending power with respect to a channel having the largest sending power for the transmission signals among the plural channels, and, on the other hand, with respect to a channel having the next larger sending power for the transmission signals, if the determined channel having sending power determined exists adjacent to the channel, for correcting the set sending power on the basis of the sending power of the determined channel. In addition, the transmitting apparatus for forming plural channels in the frequency direction and for transmitting transmission signals on the plural channels with sending power set on the basis of power controlling data delivered from communication terminal units, the transmitting apparatus comprises: receiving means for receiving the power controlling data delivered from the communication terminal units; controlling means for setting the sending power of the transmission signals on the basis of the power controlling data; transmitting means for transmitting the transmission signals; and power correcting means for determining the sending power to the set sending power with respect to a channel having the largest sending power for the transmission signals among the plural channels, and, on the other hand, with respect to channels adjacent to the determined channel having the sending power determined, for correcting the set sending power on the basis of the sending power of the determined channel.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
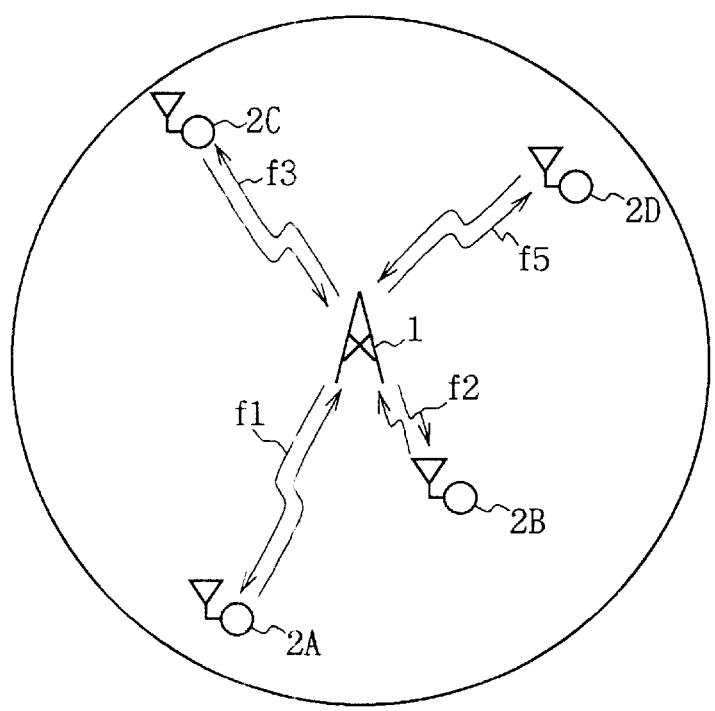
FIG. 1 is a schematic diagram explaining a status of communication that is performed in a cell.
Figure 2:
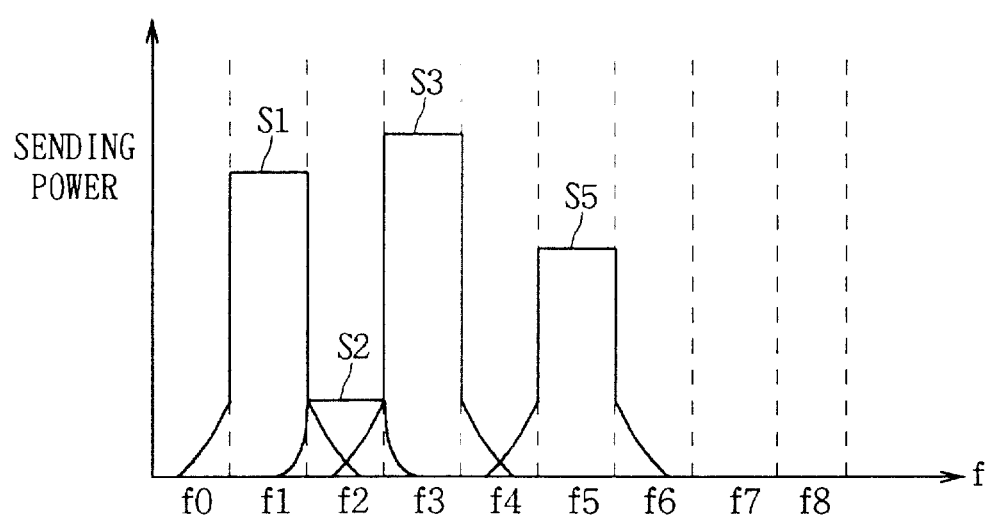
FIG. 2 is a schematic diagram explaining the deterioration of the signal-to-interference power ratio C/I owing to adjacent-channel interference.
Figure 3:
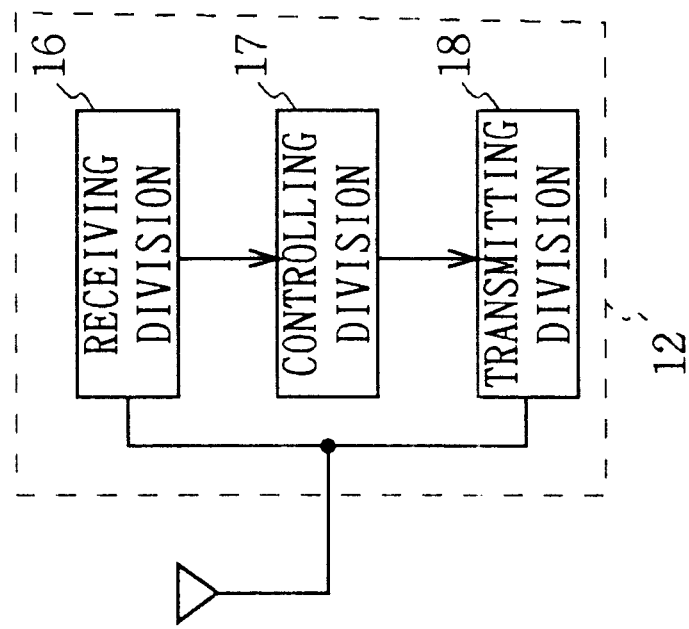
FIG. 3 is a diagram illustrating a general configuration of a cellular radio communication system to which the present invention is applied.
Figure 3:
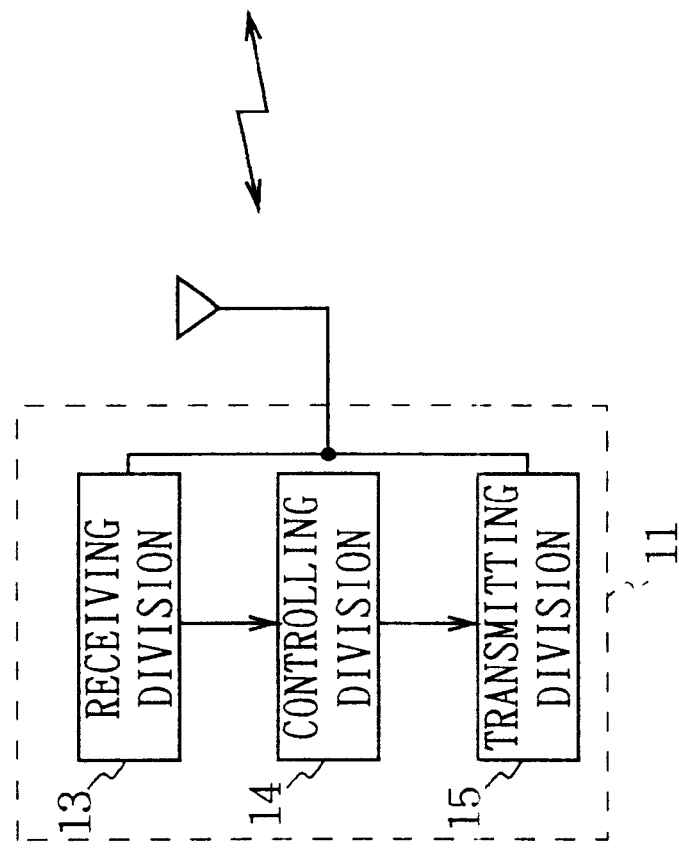

Preferred embodiments of this invention will be described with reference to the accompanying drawings:

(1) First Embodiment
(1-1) General Configuration of Cellular Radio Communication System Referring to FIG. 3, numeral 10 shows a cellular radio communication system to which the present invention is applied, a in which a transmitting apparatus 11 communicates with a communication terminal unit 12 utilizing a wireless circuit. In this case, the transmitting apparatus 11 includes a receiving division 13, a controlling division 14 and a transmitting division 15, and a communication terminal unit 12 also includes a receiving division 16, a controlling division 17 and a transmitting division 18; the transmitting apparatus 11 and the communication terminal unit 12 communicate with each other using these circuit blocks.

The receiving division 13 of the transmitting apparatus 11 receives a transmission signal from the communication terminal unit 12 and demodulates sent transmission data, and also detects control data for power controlling included in the transmission signal, and then delivers the detected control data to the controlling division 14. Besides, the receiving division 13 measures the received power of the transmission signal at the time of receiving the transmission signal from the communication terminal unit 12, and then notifies the measured received power to the controlling division 14.

The controlling division 14 produces a power control signal for controlling sending power for a transmission signal to be transmitted to the communication terminal unit 12, on the basis of the control data delivered from the receiving division 13, and then supplies the power control signal to the transmitting division 15, and also produces control data for controlling the sending power of the communication terminal unit 12 on the basis of the received power delivered from the receiving division 13, and then supplies the data also to the transmitting division 15.

The transmitting division 15 produces a transmission signal by inserting the control data, which is given from the controlling division 14, into the transmission data, and also controls sending power for the transmission signal on the basis of the power control signal, which is delivered from the controlling division 14. Further, if adjacent-channel interference has a great influence, the transmitting division 15 corrects the sending power for the transmission signal according to the sending power of the adjacent channel, and then transmits the resultant transmission signal to the communication terminal unit 12.

Similarly, the receiving division 16 of the communication terminal unit 12 receives a transmission signal from the transmitting apparatus 11 and demodulates the sent transmission data, and also detects control data for power controlling included in the transmission signal, and then delivers the detected control data to the controlling division 17. Besides, the receiving division 16 measures the received power of the transmission signal at the time of receiving the transmission signal from the transmitting apparatus 11, and then notifies the measured received power to the controlling division 17.

The controlling division 17 produces a power control signal for controlling the sending power for a transmission signal to be transmitted to the transmitting apparatus 11, on the basis of the control data delivered from the receiving division 16, and then sends the power control signal to the transmitting division 18, and also produces control data for controlling the sending power of the transmitting apparatus 11 on the basis of the received power delivered from the receiving division 16, and then sends the data also to the transmitting division 18.

The transmitting division 18 produces the transmission signal by inserting the control data given from the controlling division 17 into the transmission data, and also controls the sending power for the transmission signal on the basis of the power control signal delivered from the controlling division 17, and then transmits the resultant transmission signal to the transmitting apparatus 11.

In this way, in the cellular radio communication system 10, the transmitting apparatus 11 and the communication terminal unit 12 mutually detect the electric power of the signal that is sent from the partner, and notify the control data according to the detected electric power to the partner, thereby performing the control of the sending power.

Note that, in the transmitting apparatus 11, the receiving division 13 and the transmitting division 15 actually include plural receiving blocks and plural transmitting blocks each, in order to perform the similar radio communication with other communication terminal units existing within the cell in which the transmitting apparatus 11 is placed.

Figure 4:
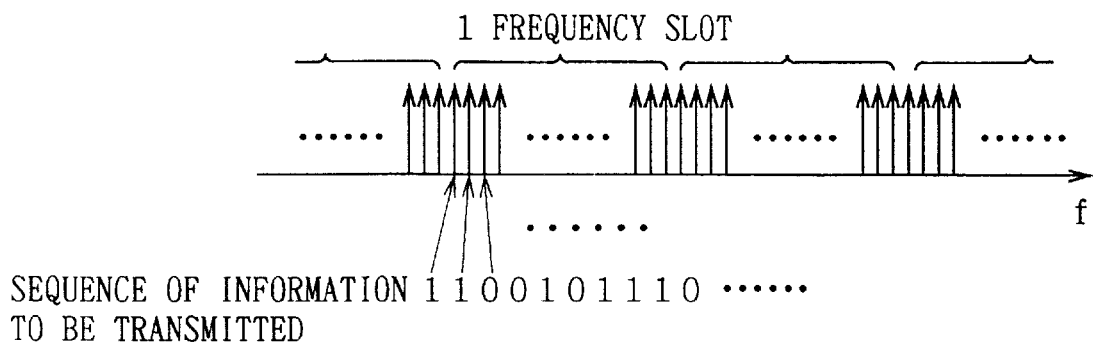
FIG. 4 is a schematic diagram explaining a multi-carrier communication system.

This cellular radio communicates system 10 communicate by radio with a multi-carrier communication system (that is also called OFDM system, etc.). In this connection, the multi-carrier communication system is such that one frequency slot is comprised of plural orthogonal sub-carriers, and, at the time of communication, information to be transmitted is allocated to the plural sub-carriers and then transmitted by utilizing the frequency slot, as shown in FIG. 4. Therefore, the information to be transmitted can be distributed on the frequency axis and transmitted, so that radio communication can be performed which is resistant to frequency selective fading.

Figure 5:
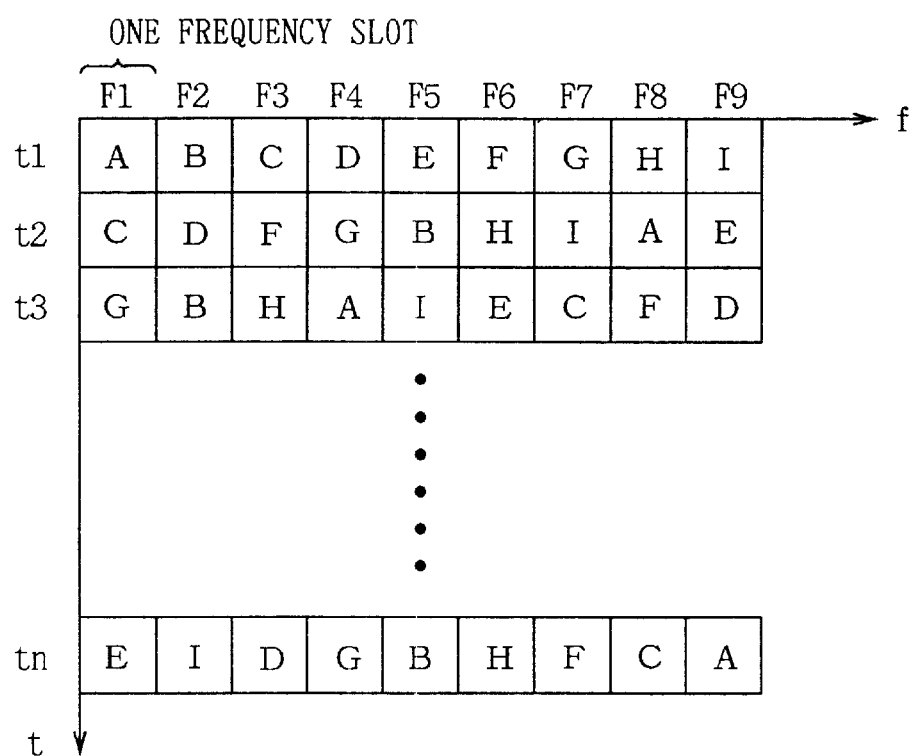
FIG. 5 is a channel arrangement diagram explaining frequency hopping.

Besides, in the cellular radio communication system 10, a frequency slot to be used for communication is changed, temporally, on the basis of a stated pattern, that is, a frequency hopping is performed. For instance, assuming that nine frequency slots F1 to F9 are allocated to the transmitting apparatus 11 and these nine frequency slots F1 to F9 form nine down communication channels A to I, the frequency slots F1 to F9 are not univocally allocated to nine channels of the down communication channels A to I, but each of down communication channels A to I decides the frequency slot F1 to F9 to be used, for each time slot, as shown in FIG. 5.

For instance, in the down communication channel A, the frequency slot F1 is used at the time slot t1, the frequency slot F8 is used at the time slot t2, and the frequency slot F4 is used at the time slot t3. And, in this down communication channel A, the selection pattern is repeated in like manner from the time slot t1 to the time slot tn. Similarly, in the down communication channel B, the frequency slot F2 is used at the time slot t1, the frequency slot F5 is used at the time slot t2, and the frequency slot F2 is used at the time slot t3. And, in the down communication channel B, the selection pattern is repeated in like manner from the time slot t1 to the time slot tn. By changing the frequency slot to be used for each time slot in this manner, it is able to avoid receiving always the interference wave of the identical frequency, and able to alleviate the influence of the interference wave.

In the communication terminal unit 12 also, the frequency slot that is used for communication is altered according to the stated pattern, as with the transmitting apparatus 11. That is, on the assumption that nine frequency slots f1 to f9 have been allocated, harmonizing with the transmitting apparatus 11, and these nine frequency slots f1 to f9 form the up communication channels a to i, each of up communication channels a to i changes the frequency slot f1 to f9 that is used, for each time slot, in accordance with the stated pattern.

(1-2) Instance Configuration of Transmitting apparatus

Figure 6:
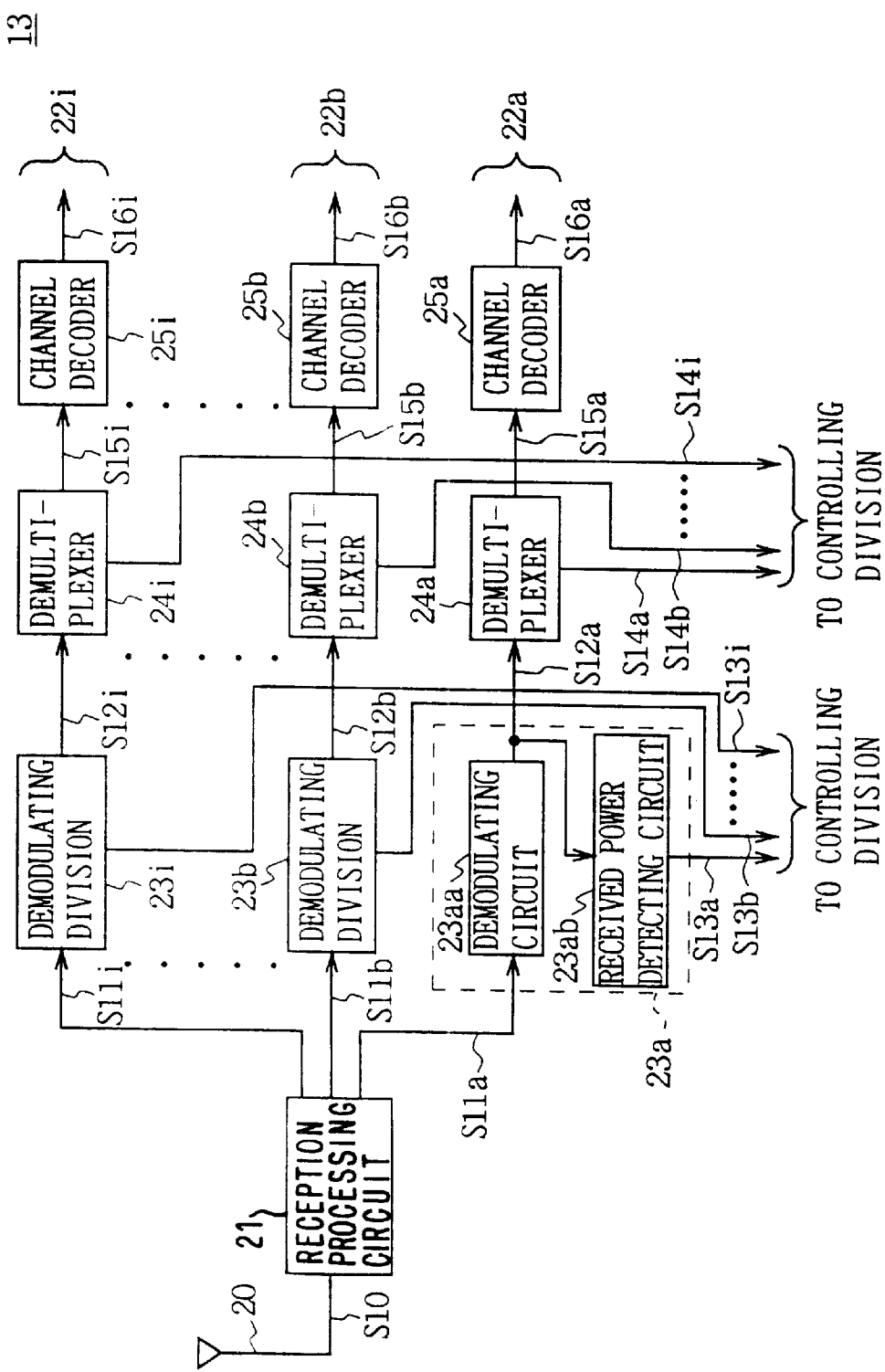
FIG. 6 is a block diagram illustrating a configuration of the receiving division of a transmitting apparatus.

In this paragraph, an explanation is given to an instance configuration of the transmitting apparatus 11. As shown in FIG. 6, the receiving division 13 of the transmitting apparatus 11 is comprised of an antenna 20, a reception processing circuit 21, and plural reception blocks 22a to 22i corresponding to the up communication channels a to i.

In the receiving division 13, the received signal S10 that has been received with the antenna 20 is first inputted to the reception processing circuit 21. By performing frequency conversion and/or Fourier transformation processing, etc. on the received signal S10 as described later, the reception processing circuit 21 extracts respective received symbols S11a to S11i sent through the respective up communication channels a to i from the received signal S10, and then outputs the symbols toward the respective reception blocks 22a to 22i.

In the reception block 22a, at first, the received symbol S11a is inputted to a demodulating circuit 23aa of a demodulating division 23a. The demodulating circuit 23aa exposes the received symbol S11a, which has been subjected to differential quadrature phase shift keying (DQPSK) modulation, to DQPSK demodulation processing, and outputs the resultant received symbol S12a to a demultiplexer 24a of the subsequent stage and to a received power detecting circuit 23ab in the demodulating division 23a. In this connection, the demodulating circuit 23a demodulates only the portion of differential modulation, and so the received symbol S12a outputted is still in such a state that it has been subjected to QPSK modulation.

The received power detecting circuit 23ab detects the received power of the signal transmitted through the up communication channel a on the basis of the width of the supplied received symbol S12a, and sends out the received power to the controlling division 14 as the received-power information S13a.

On the other hand, the demultiplexer 24a extracts a control symbol S14a that shows the control data for the sending power, from the received symbol S12a, and sends out the extracted control symbol S14a to the controlling division 14. Besides, the demultiplexer 24a outputs a received symbol S15a that remains after extracting the control symbol S14a, to a channel decoder 25a.

By exposing the received symbol S15a to QPSK demodulation processing, the channel decoder 25a restores the data bit S16a sent through the up communication channel a.

Similarly, the reception blocks 22b to 22i respectively perform the same processing by the use of demodulating divisions 23b to 23i, demultiplexers 24b to 24i and channel decoders 25b to 25i so as to detect the received power of the signals arrived through the respective communication channels b to i and to send out the received power information S13b to S13i to the controlling division 14, and respectively extract and transmit control symbols S14b to S14i indicating the control data for the sending power, to the controlling division 14 and moreover, respectively restore data bit S16b to S16i arrived through the respective communication channels b to i.

Figure 7:
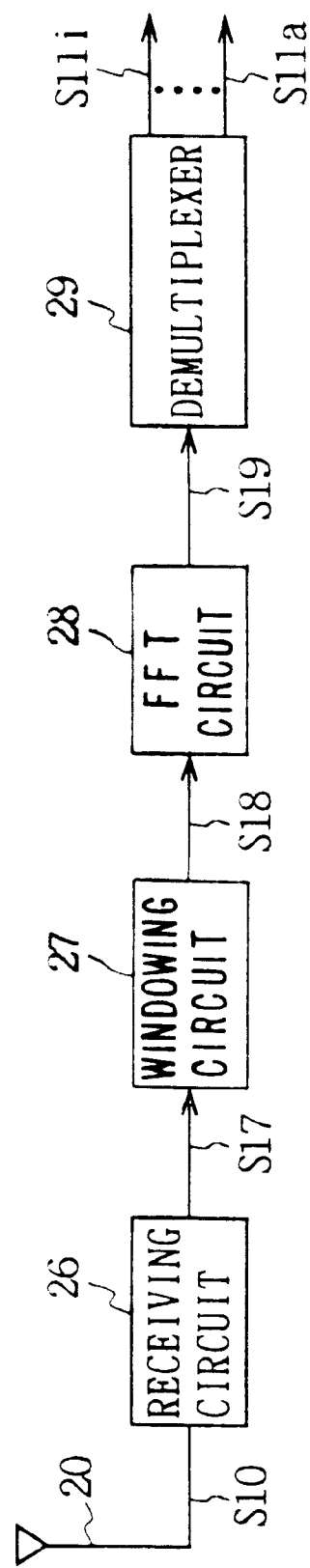
FIG. 7 is a block diagram illustrating a configuration of the reception processing circuit that is placed in the receiving division of the transmitting apparatus.

The configuration of the reception processing circuit 21 is shown in FIG. 7. The reception processing circuit 21 is roughly comprised of a receiving circuit 26, a windowing circuit 27, a fast Fourier transformation circuit (FFT) 28 and a demultiplexer 29, and the received signal S10 received with the antenna 20 is inputted to the receiving circuit 26, as shown in the FIG. 7.

The receiving circuit 26 exposes the received signal S10 to filtering process and then to frequency converting process, so as to convert the received signal S10 into a received signal S17 being the base band, and then outputs the signal S17 to the windowing circuit 27. The windowing circuit 27 exposes the received signal S17 to windowing process, so as to take out the signal components for one time-slot, from the received signal S17, and then outputs the signal components to the fast Fourier transformation circuit 28 as a-received signal S18.

Figure 8A:
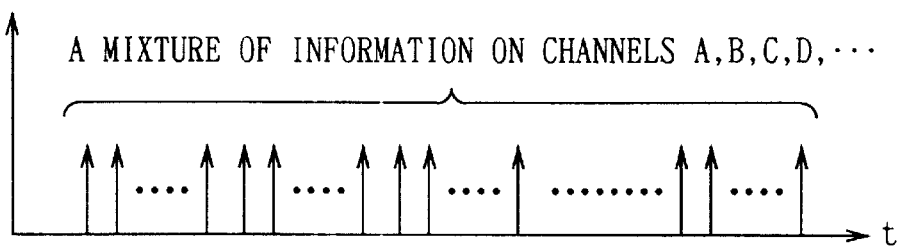
FIGS. 8A and 8B are schematic diagrams explaining the operation of a fast Fourier transformation circuit.
Figure 8B:
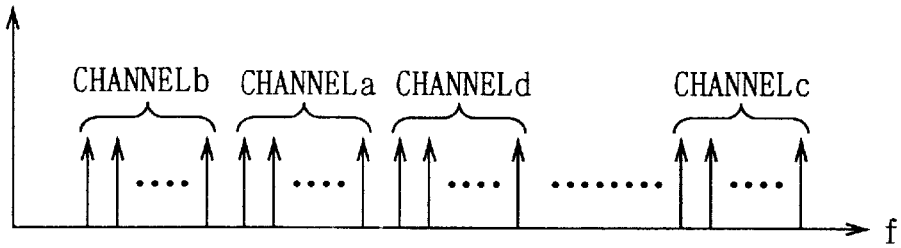

The fast Fourier transformation circuit 28 exposes the received signal S18 to Fourier transformation process, so as to take out the symbol information that has been allocated to the plural subcarriers and arranged upon the time axis in such a manner that it is arranged upon the frequency axis, as shown in FIGS. 8A and 8B, and then outputs the information to the demultiplexer 29 as a received symbol S19. The demultiplexer 29 distributes the received symbol S19 in which the symbols of all up communication channels a to i are mixed among the respective channels, and outputs the resultant received symbols S11a to S11i to the reception blocks 22a to 22i of the respective channels of the subsequent stage. In the case of this cellular radio communication system, frequency hopping is performed, therefore, the sequence of the channels a to i are not always the sequence of the channel numbers, as shown in FIGS. 8A and 8B.

Figure 9:
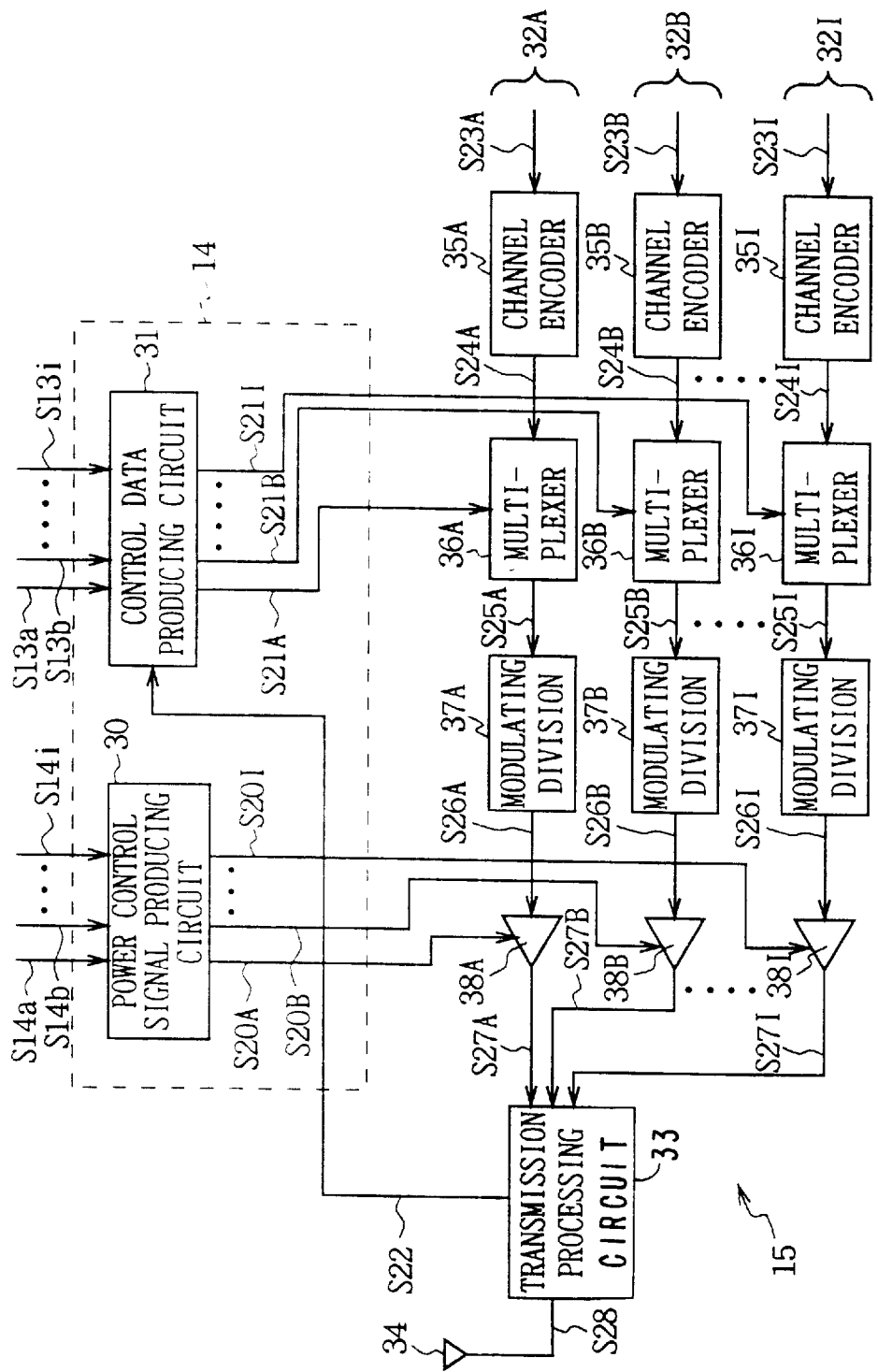
FIG. 9 is a block diagram illustrating configurations of the transmitting division and the controlling division of the transmitting apparatus.

Then, the configurations of the controlling division 14 and the transmitting division 15 in the transmitting apparatus 11 will be described, referring to FIG. 9. The controlling division 14 is roughly comprised of a power control signal producing circuit 30 and a control data producing circuit 31, as shown in the FIG. 9. The power control signal producing circuit 30 receives the control symbols S14a to S14i extracted by the respective demultiplexers 24a to 24i of the above-mentioned receiving division 13 and, on the basis of the power controlling quantities that are indicated by the control symbols S14a to S14i, produces the respective power control signals S20A to S20I for controlling the sending power of the down communication channels A to I, and then outputs the signals S20A to S20I to the respective transmission blocks 32A–32I, which would be described later, of the transmitting division 15.

The control data producing circuit 31 receives the above-mentioned received power information S13a to S13i delivered from the respective demodulating divisions 23a to 23i of the receiving division 13, determines the respective power controlling quantities for controlling the sending power of the respective communication terminal units that perform communication using the up communication channels a to i, on the basis of the received-power information S13a to S13i. Then, the control data producing circuit 31 produces the control symbols S21A to S21I that signify the determined power controlling quantities, and then outputs these control symbols to the respective transmission blocks 32A to 32I, which are described herein below, of the transmitting division 15.

Note that, the control data producing circuit 31, in the case where a transmission processing circuit 33 described later performs power correction against adjacent-channel interference at the time of determining the power controlling quantity, adds the quantity of correction against the adjacent-channel interference to the quantity of power controlling for the channel so as to produce the control symbol, on the basis of the channel information S22 that is outputted from the transmission processing circuit 33. By this, in the case of performing correction against adjacent-channel interference with respect to a desired channel out of the down communication channels A to I, the correction against adjacent-channel interference can be performed with respect to the up communication channel that corresponds to the channel as well.

On the other hand, the transmitting division 15 is roughly comprised of an antenna 34, the transmission processing circuit 33, and plural transmission blocks 32A to 32I set corresponding to the down communication channels A to I.

In the transmission block 32A, a data bit S23A to be transmitted using the down communication channel A is first inputted to a channel encoder 35A. The channel encoder 35A exposes the data bit S23A to QPSK modulation so as to produce and output a transmission symbol S24A to a multiplexer 36A. The multiplexer 36A, receiving the control symbol S21A, which is related to the up communication channel a and is produced by the control data producing circuit 31, inserts the control symbol S21A into the stated position of the transmission symbol S24A to produce and output a transmission symbol S25A to a modulating division 37A.

By exposing the transmission symbol S25A to differential modulation, the modulating division 37A produces a DQPSK-modulated transmission symbol S26A, and then outputs the transmission symbol S26A to a variable gain amplifier 38A. The variable gain amplifier 38A, receiving the power control signal S20A produced by the power control signal producing circuit 30, amplifies the transmission symbol S26A with the gain value based on the power control signal S20A, so as to rectify the amplitude of the transmission symbol S26A such that it becomes such a sending-power value directed by the communication terminal unit of the communication partner, and then outputs the resultant transmission symbol S27A to the transmission processing circuit 33.

Similarly, in the transmission blocks 32B to 32I, the channel encoders 35B to 35I produce the transmission symbols S24B to S24I using the data bits S23B to S23I respectively. The multiplexer 36B to 36I insert the control symbols S21B to S21I into the transmission symbols S24B to S24I in order to produce the transmission symbols S25B to S25I, respectively. Then, in the transmission blocks 32B to 32I, the modulating division 37B to 37I perform the differential modulation on the transmission symbols S25B to S25I to produce the transmission symbols S26B to S26I, respectively. The variable gain amplifiers 38B to 38I rectify the amplitudes of the transmission symbols S26B to S26I to produce the transmission symbols S27B to S27I having sending power directed by the communication terminal unit of the communication partner, and output the transmission symbols S27B to S27I to the transmission processing circuit 33, respectively, in like manner.

By integrating the transmission symbols S27B to S27I produced by the respective transmission blocks 32A to 32I into one and exposing it to inverse Fourier transformation process, frequency conversion process, etc., the transmission processing circuit 33 produces and outputs the transmission signal S28 to the antenna 34 to transmit. At this time, if it is decided that there is a down communication channel that is suffered from adjacent-channel interference, the transmission processing circuit 33 performs power correction against the adjacent-channel interference, with respect to the transmission signal to be transmitted through the down communication channel. By this, it is able to prevent being suffered from adjacent-channel interference and to perform communication satisfactory. In this connection, when power correction against the adjacent-channel interference has been performed, the transmission processing circuit 33 outputs the channel information S22 showing the channel to the control data producing circuit 31 of the controlling division 14, as stated above.

Figure 10:
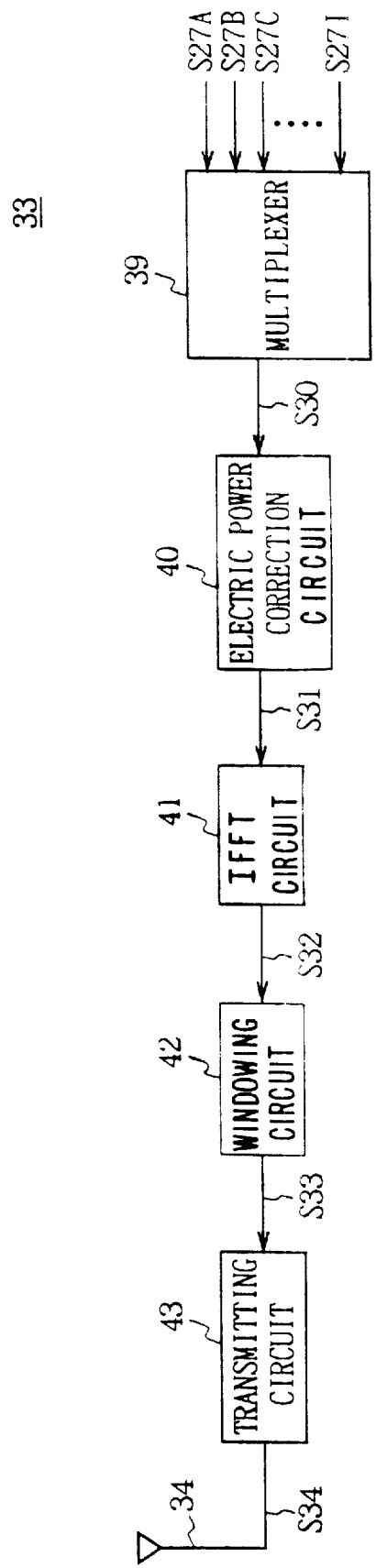
FIG. 10 is a block diagram illustrating a configuration of the transmission processing circuit that is placed in the transmitting division of the transmitting apparatus.
Figures 11A, 11B:
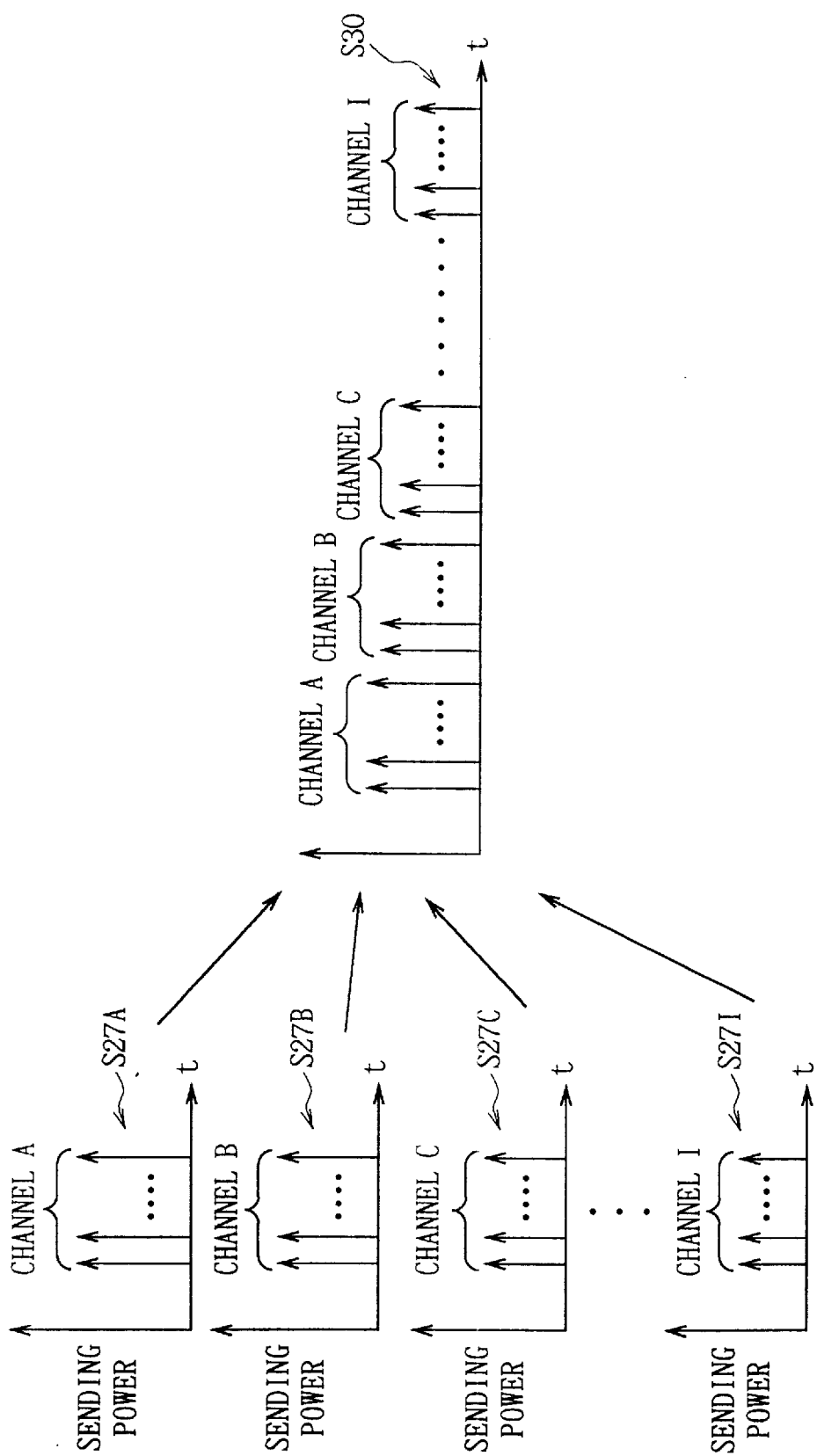
FIGS. 11A and 11B are schematic diagrams explaining operation of a multiplexer of the transmission processing circuit.

A configuration of the transmission processing circuit 33 is shown in FIG. 10. In the transmission processing circuit 33, the transmission symbols S27A to S27I supplied from the respective transmission blocks 32A to 32I are first inputted to the multiplexer 39, as shown in the FIG. 10. In this connection, the transmission symbols S27A to S27I have been subjected to amplitude regulation by the variable gain amplifiers 38A to 38I, so that the symbols S27A to 27I have been already set to the sending power directed by the communication terminal units of the respective communication partners, as shown in FIG. 11A.

The multiplexer 39 integrates the transmission symbols S27A to S27I into one on the time axis and moreover, rearranges the sequence on the basis of the hopping pattern of frequency hopping shown in FIG. 5, and then outputs the resultant transmission symbol S30 to an electric-power correcting circuit 40. For instance, in the case where the transmission timing corresponds a to the time slot t1 shown in FIG. 5, the channel sequence is the sequence of A, B, C, D, E, F, G, H, I, therefore, the transmission symbols S27A to S27I are arranged on the time axis into the sequence of A, B, C, D, E, F, G, H, I, as shown in FIG. 11B.

The electric-power correcting circuit 40 is a circuit for finding such a channel that is greatly suffered from adjacent-channel interference out of the channels A to I, and performing electric-power correction with respect to the transmission symbol of the channel, thereby preventing deterioration of the signal-to-interference power ratio C/I that is due to adjacent-channel interference.

Figure 12:
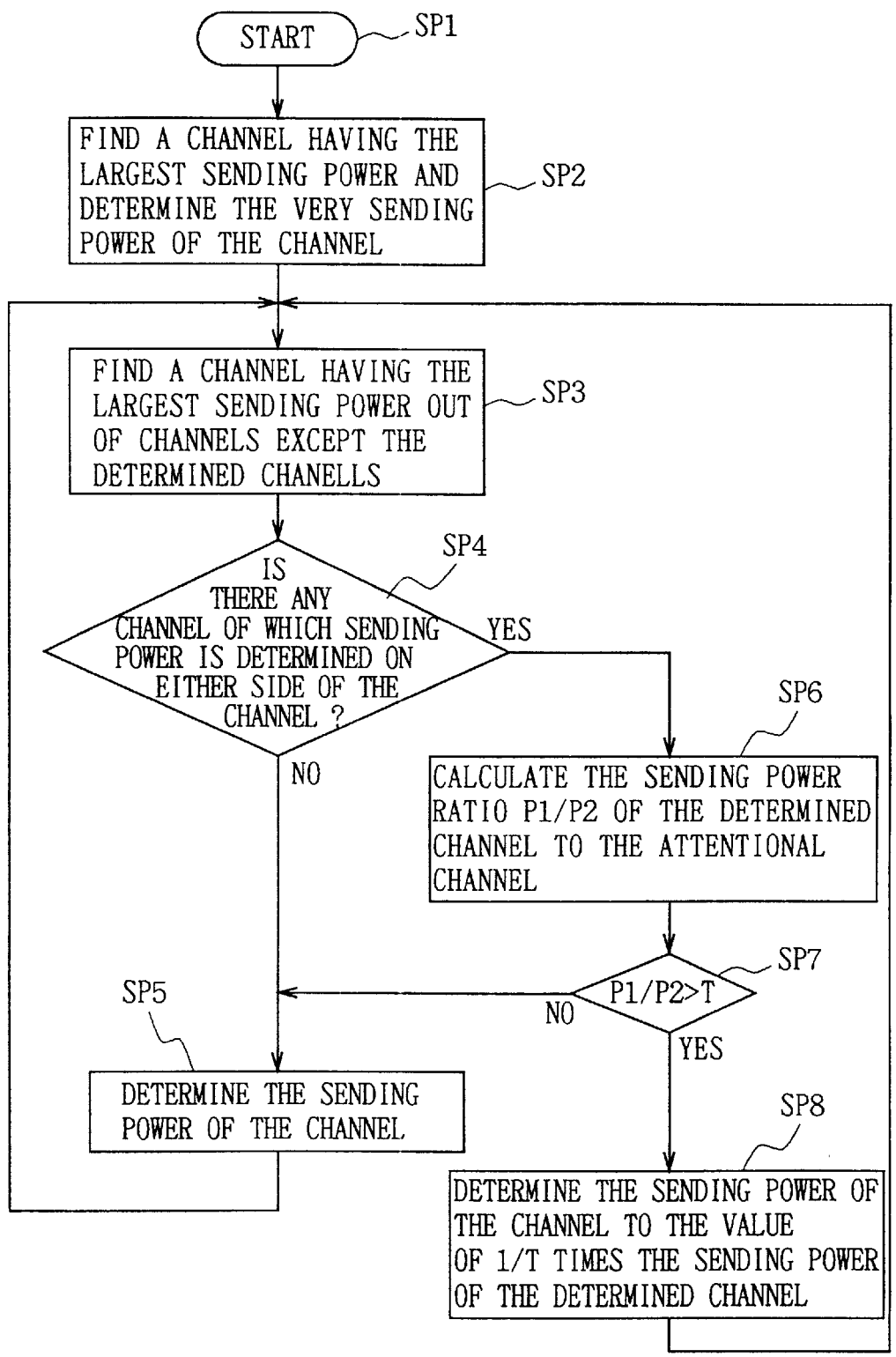
FIG. 12 is a flow chart showing the power correction processing performed by the electric-power correcting circuit.

At this point, power correcting process in the electric-power correcting circuit 40 is described, referring to the flow chart shown in FIG. 12. The electric-power correcting circuit 40 first enters from the step SP1 and then, at the step SP2, it finds a channel having the largest sending power out of the transmission symbol S30, and determines the sending power of the channel to the already set sending power. Next, at the step SP3, the electric-power correcting circuit 40 finds a channel having the largest sending power out of the channels except the determined channels. At the following step SP4, it judges whether there is any determined channel whose sending power has been already determined, on either side of the channel or not. In the case where there is not a determined channel on either side, the electric-power correcting circuit 40 goes to the step SP5 to determine the sending power of the channel to the already set value, and then returns to the step SP3 to repeat the processing.

On the other hand, as the result of the decision at the step SP4, when a determined channel whose sending power has been determined exists on either side, the electric-power correcting circuit 40 goes to the step SP6 to calculate the sending power ratio P1/P2 that is the ratio of the sending power P1 of the determined channel to the sending power P2 set for the noticed channel. Next, at the step SP7, the electric-power correcting circuit 40 judges whether the calculated sending-power ratio P1/P2 is larger than the stated threshold value T or not. When the ratio is smaller than the stated threshold value T (that is, the sending power of the adjacent determined channel is smaller than the reference), the electric power correcting circuit 40 decides that the influence of the adjacent-channel interference is small, and then goes to the step SP5 to determine the sending power of the channel to the set value.

On the contrary, as the result of the decision at the step SP7, when the ratio of the sending-power ratio P1/P2 is larger than the stated threshold value T (that is, the sending power of the adjacent determined channel is larger than the reference), the circuit 40 decides that the influence of the adjacent-channel interference is large, and then goes to the step SP8. At the step SP8, the electric-power correcting circuit 40 determines the sending power of the channel to the value of 1/T times the sending power P1 of the adjacent determined channel, and then returns to the step SP3 to repeat the processing.

In this manner, the electric-power correcting circuit 40 first finds a channel having the largest sending power and determines the sending power of the channel. Then, the circuit 40 finds a channel having the next larger sending power, and judges whether there is any determined channel whose sending power has been already determined on either side of the channel or not. If a determined channel exists, the circuit 40 calculates the sending power ratio P1/P2 against the determined channel and then, if the sending power ratio P1/P2 is larger than the stated threshold value T, sets the sending power of the channel to the value of 1/T times the sending power P1 of the adjacent determined channel. After that, by similarly repeating this processing in the descending order of the sending power set, the electric-power correcting circuit 40 finds the channels that are greatly suffered from adjacent-channel interference, in order to correct the sending power of the channels.

In the cellular radio communication system 10, frequency hopping is performed, so that the sequence of channels varies for each time slot. Therefore, the electric power correcting circuit performs the power correcting process for each time slot. Besides, the value of the threshold T, which is treated as the reference, is a value determined on the basis of the channel isolation (that is, the degree of separation of the channels) of the communication terminal units, the status of the propagation of the radio waves (that is, the status of multi-path fading, Doppler effect, etc. in the communication environment), etc., for example, is set to the value 10 to 20.

Figure 13A:
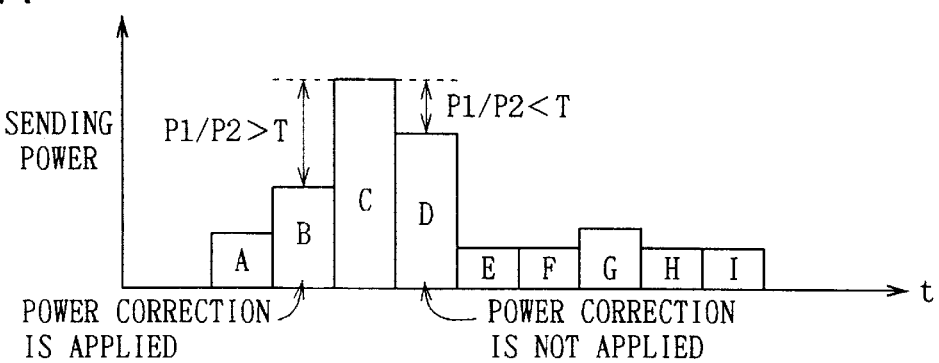
FIGS. 13A and 13B are schematic diagrams explaining the operation of the power correction processing.
Figure 13B:
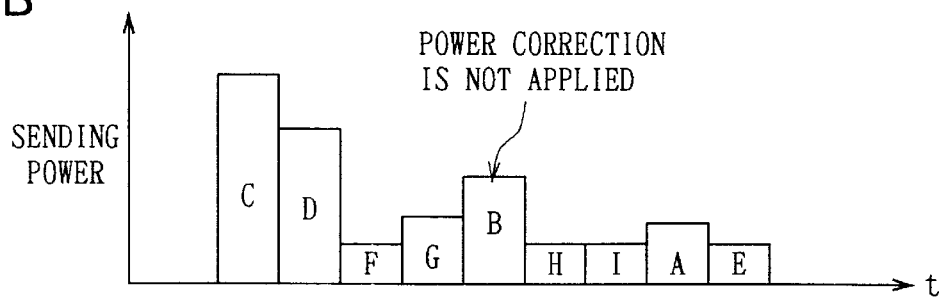

At this point, an example of power correction processing in the electric-power correcting circuit 40 is described, referring to FIGS. 13A and 13B. On the assumption that a sequence of the channels A to I is the sequence of A, B, C, D, E, F, G, H, I at the time slot t1 as shown in FIG. 13A, the electric-power correcting circuit 40 finds a channel having the largest sending power out of these channels and, determines the sending power of the channel. In the example shown in the FIG. 13A, the channel C has the largest sending power, therefore, the electric-power correcting circuit 40 determines the sending power of the channel C, at first.

Next, the electric-power correcting circuit 40 finds a channel having the largest sending power out of the channels except the determined channels, judges whether any channel having the determined sending power exists on either side of the channel or not. If a channel exists, the electric-power correcting circuit 40 calculates the ratio P1/P2 of the sending power of the found channel to the determined channel, in order to compare the ratio to the threshold value T. If the ratio is larger than the threshold value T, the circuit 40 performs power correction of the channel, and, if smaller, determines the sending power of the channel without performing the power correction. In the example shown in FIG. 13A, the channel D is the largest among the channels except the determined channels, therefore, it is judged whether any determined channel exists on either side of the channel D or not. In this case, the channel C is a determined channel, so the ratio P1/P2 of the sending power of the channel C to the sending power of the channel D is calculated to be compared to the threshold value T. In this example, the sending power ratio P1/P2 is smaller than the threshold value T, therefore, the sending power of the channel D is determined to the previously set value without performing power correction.

Next, a channel having the largest sending power among the channels except the determined channels is the channel B, so the electric-power correcting circuit 40 judges whether any determined channel exists on either side of the channel B or not. In this example, the channel C is a determined channel, so the sending power ratio P1/P2 of the channel C to the channel B is calculated to be compared to the threshold value T. In this example, the sending power ratio P1/P2 of the channels C and B is larger than the threshold value T. Therefore, the electric-power correcting circuit 40 determines the sending power of the channel B to the value of 1/T times the sending power of the channel C.

By repeating such processes in order, the electric-power correcting circuit 40 corrects the sending power of the channels that are greatly suffered from adjacent-channel interference. By previously raising the sending power of the channels that are greatly suffered from adjacent-channel interference in this manner, it is able to prevent being suffered from adjacent-channel interference to perform communication satisfactory.

In this cellular radio communication system 10, frequency hopping is performed, so that the sequence of the channels varies for each time slot. Therefore, the electric-power correcting circuit 40 performs such power correcting processes for each time slot. For instance, if the sequence of the channels is varied into the sequence shown in FIG. 13B at the time slot t2, the electric-power correcting circuit 40 performs power correction processing at the time slot t2 also. In this case, when the power correction processing is performed on and on in like manner, there is no determined channel having the large sending power on each side of the channel B previously subjected to power correction, therefore, power correction of the channel B is not performed. By performing power correction processing for each time slot in this manner, the power correction is performed at only the time when the influence of the adjacent-channel interference is large, so the power correction can be performed efficiently.

Returning to FIG. 10, the explanation of the transmission processing circuit 33 is continued. The transmission symbol S31, which is subjected to power correction by such processing of the electric-power correcting circuit 40, is outputted to an inverse fast Fourier transformation circuit (IFFT) 41. By exposing the transmission symbol S31 to inverse Fourier transformation process, the inverse fast Fourier transformation circuit 41 rearranges the symbol information arranged on the time axis, onto the frequency axis, and allocates the symbol information to the respective sub-carriers. Then, the inverse fast Fourier transformation circuit 41 outputs the resultant transmission signal S32 to a windowing circuit 42. The windowing circuit 42 exposes the transmission signal S32 to windowing processing so as to limit the transmission signal S32 to the signal components for one time slot, and outputs the resultant transmission signal S33 to a transmitting circuit 43. By exposing the transmission signal S33 to frequency conversion process, the transmitting circuit 43 produces a transmission signal S34 converted into the frequency band of the down communication channels A to I, and performs filtering process on the signal S34, and then transmits the resultant via the antenna 34.

(1-3) Instance Configuration of Communication Terminal Unit

Figure 14:
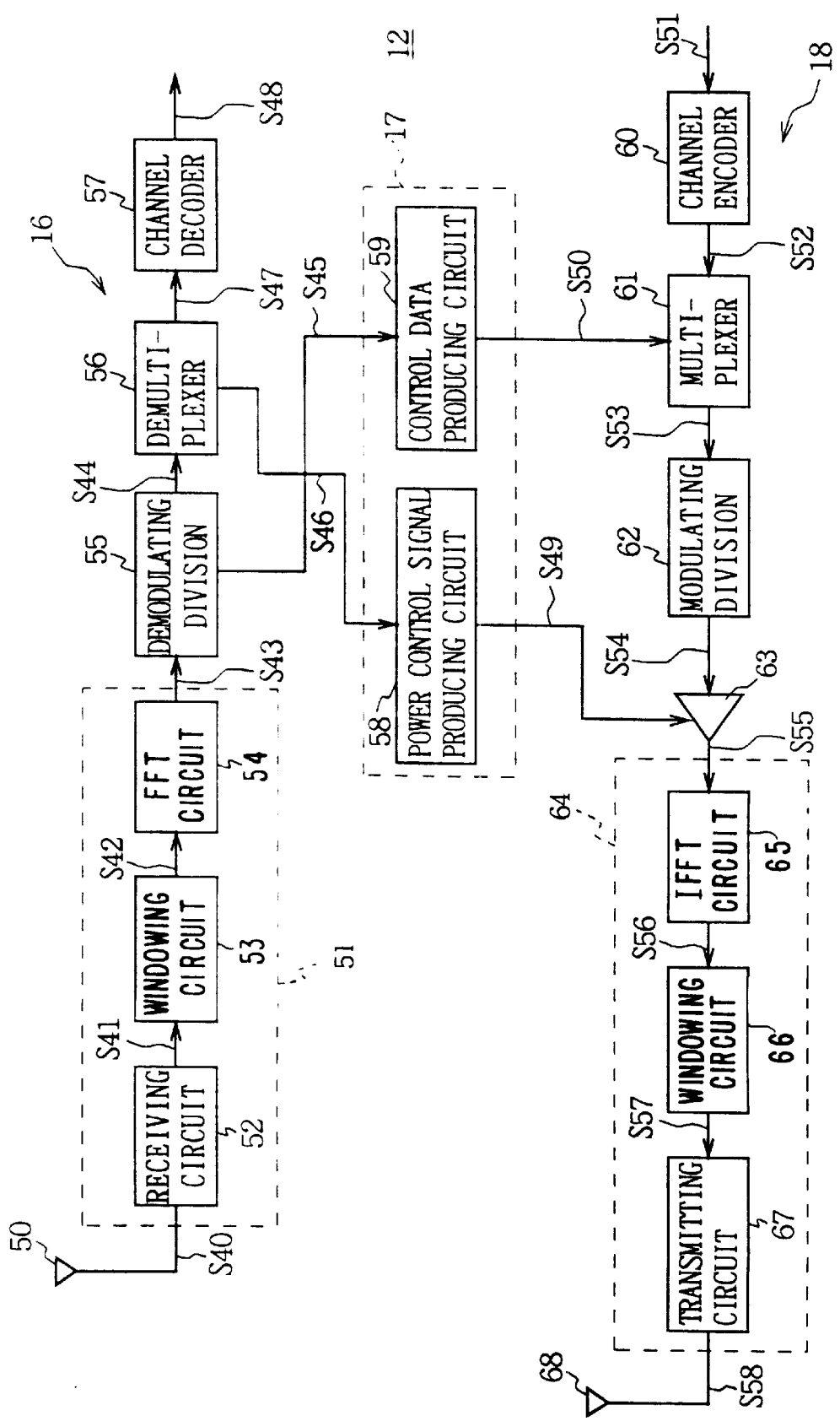
FIG. 14 is a block diagram illustrating a configuration of a communication terminal unit.

Then, in this paragraph, an instance configuration of a communication terminal unit 12 is explained. As shown in FIG. 14, in the communication terminal unit 12, a received signal S40 received with the antenna 50 is first inputted to a receiving circuit 52 that is a component of a reception processing circuit 51. The receiving circuit 52 exposes the received signal S40 to filtering process so as to take out the received signal sent through the stated down communication channel, and then exposes the taken received signal to frequency conversion process so as to produce a received signal S41 of the base band, and outputs the received signal S41 to a windowing circuit 53.

The windowing circuit 53 exposes the received signal S41 to windowing processing so as to take out signal components for one time slot from the received signal S41, and then outputs the signal components to a fast Fourier transformation circuit (FFT) 54 as a received signal S42. The fast Fourier transformation circuit 54 exposes the received signal S42 to Fourier transformation, so as to rearrange and take out the symbol information allocated to the plural sub-carriers and arranged on the frequency axis, upon the time axis, and then outputs the symbol information to a demodulating division 55 as a received symbol S43.

The demodulating division 55, which has the same configuration as that of the demodulating division 23a of the transmitting apparatus 11, exposes the received symbol S43 subjected to DQPSK modulation, to differential demodulation by the use of an included demodulation circuit so as to produce a received symbol S44. Further, the demodulating division 55 detects received power on the basis of the received symbol S43 by the use of an included received-power detecting circuit to produce a received-power information S45. Then, the demodulating division 55 outputs the received symbol S44 to a demultiplexer 56, and also outputs the received-power information S45 to the controlling division 17.

The demultiplexer 56 extracts the control symbol S46 indicating the control data of the sending power out of the received symbol S44, and transmits the extracted control symbol S46 to a controlling division 17. Besides, the demultiplexer 56 outputs the received symbol S47 which remains after extracting the control symbol S46, to a channel decoder 57.

By applying QPSK demodulation processing to the received symbol S47, the channel decoder 57 restores the data bit S48 delivered through the stated down communication channel from the transmitting apparatus 11 being the communication partner.

On the other hand, the controlling division 17 is roughly comprised of a power control signal producing circuit 58 and a control data producing circuit 59. The controlling division 17 inputs the control symbol S46 delivered from the receiving division 16, to the power control signal producing circuit 58 and moreover, inputs the received-power information S45 delivered from the receiving division 16, to the control data producing circuit 59.

The power control signal producing circuit 58 produces a power control signal S49 for controlling the sending power for transmission toward the transmitting apparatus 11, on the basis of the control symbol S46, and then delivers the power control signal to the transmitting division 18 that is described herein below. Besides, the control data producing circuit 59 determines the quantity of electric-power controlling for controlling the sending power of the transmitting apparatus 11, on the basis of the received-power information S45, and produces a control symbol S50 indicating the power controlling quantities, and then delivers the control symbol S50 to the transmitting division 18 that is described herein below.

In the transmitting division 18, the data bit S51 to be transmitted toward the transmitting apparatus 11 is inputted to a channel encoder 60, at first. The channel encoder 60 exposes the data bit S51 to QPSK modulation, so as to produce a transmission symbol S52, and then outputs the transmission symbol S52 to a multiplexer 61. The multiplexer 61, receiving the control symbol S50 from the control data producing circuit 59 of the controlling division 17, inserts the control symbol S50 into the stated position of the transmission symbol S52 to produce a transmission symbol S53, and outputs the transmission symbol S53 to a modulating division 62.

By applying differential modulation to the transmission symbol S53, the modulating division 62 produces a DQPSK-modulated transmission symbol S54, and then outputs the transmission symbol S54 to a variable gain amplifier 63. The variable gain amplifier 63, receiving the power control signal S49 produced by the power control signal producing circuit 58 of the controlling division 17, amplifies the transmission symbol S54 with the gain value based on the power control signal S49, so as to rectify the amplitude of the transmission symbol S54 such that it becomes the sending power directed by the transmitting apparatus 11 being the communication partner. The resultant transmission symbol S55 is outputted to a inverse fast Fourier transformation circuit (IFFT) 65 of a transmission processing circuit 64.

Note that, in the case where the power correction against adjacent-channel interference is performed in the transmitting apparatus 11 with respect to the down communication channel that is received by the receiving division 16, the control symbol S46 also, which is delivered from the transmitting apparatus 11, is corrected in conjunction with the power correction of the down communication channel. Therefore, if the sending power of the up communication channel is controlled on the basis of the control symbol S46, power correction against adjacent-channel interference can be automatically performed with respect to the up communication channel also, and influences of adjacent-channel interference can be prevented.

The inverse fast Fourier transformation circuit 65 applies inverse Fourier transformation processing to the transmission 3symbol S55 so as to rearrange the symbol information arranged upon the time axis, onto the frequency axis, allocates the symbol information to the respective subcarriers, and outputs the resultant transmission signal S56 to a windowing circuit 66. The windowing circuit 66 exposes the transmission signal S56 to windowing processing so as to limit the transmission signal S56 to the signal components for one time slot, and outputs the resultant transmission signal S57 to the transmitting circuit 67. The transmitting circuit 67 applies frequency conversion process to the transmission signal S57 so as to produce a transmission signal S58 converted into the frequency band of the stated up communication channel. Then, the transmitting circuit 67 applies filtering process to the transmission signal S58, and transmits the resultant signal via an antenna 68.

(1-4) Operation and Effects

With the above configuration, in this cellular radio communication system 10, when the transmitting apparatus 11 and the communication terminal unit 12 perform communication with each other, they mutually detects received power of the signal delivered from the communication partner, transmits the sending power controlling data based on the result of the detection, to the communication partner, and sets their sending power for transmission on the basis of the controlling data.

At that time, the transmitting apparatus 11 finds channels that are greatly suffered from adjacent-channel interference out of the down communication channels A to I used for transmitting toward the communication terminal unit 11. With respect to the channels, the transmitting apparatus 11 applies correction to the sending power based on the control data in order to alleviate the influences of the adjacent-channel interference. Specifically, the electric-power correcting circuit 40 of the transmitting apparatus 11 first finds a channel having the largest sending power out of the down communication channels A to I, and with respect to the channel, determines the sending power set based on the control data. Next, the electric-power correcting circuit 40 finds a channel having the largest sending power out of the channels except the determined channels having the determined sending power, and judges whether any determined channel exists on either side of the channel or not. If any determined channel do not exist, the electric-power correcting circuit 40 determines the sending power of the channel to the value based on the control data. On the other hand, if a determined channel exists, the electric-power correcting circuit 40 calculates the power ratio P1/P2 of the sending power P1 of the determined channel to the sending power P2 of the channel. Then, if the power ratio P1/P2 is larger than the threshold value T, the circuit 40 judges that the influence of adjacent-channel interference is large, and sets the sending power of the channel to the value of 1/T times the sending power P1 of the determined channel. By sequentially performing such a correcting process, the sending power of all channels are determined one after the other.

In this way, with respect to the channel having the largest sending power among the plural down channels A to I, the transmitting apparatus 11 determines the sending power to the power set based on the control data. And, with respect to the channel having the next larger sending power, if any determined channel having the determined sending power exists on either side of the channel, the sending power of the channel is corrected on the basis of the sending power of the determined channel, so that it is able to correct the signal-to-interference power ratio C/I of the channel that is greatly suffered from adjacent-channel interference. Thus, the signal-to-interference power ratio C/I can be prevented from deteriorating.

According to the above configuration, with respect to the channel having the largest sending power among the plural down channels A to I, the sending power is determined to the power set based on the control data. And, with respect to the channel having the next larger sending power, if any determined channel having the determined sending power exists on either side of the channel, the sending power of the channel is corrected on the basis of the sending power of the determined channel. Therefore, it is able to prevent the signal-to-interference power ratio C/I from deteriorating due to adjacent-channel interference. Thus, it is able to avoid the influence of adjacent-channel interference to perform communication satisfactory.

(2) Other Embodiments

In the above embodiment as shown in FIG. 12, the sending power of a channel having the largest sending power is determined, and then a channel having the next larger sending power is found to judge whether any determined channel having the determined sending power exists on either side of the channel or not. If any determined channel exists, the ratio P1/P2 of electric-power of the determined channel to the channel is calculated to be compared to the stated threshold value T. If the power ratio P1/P2 is larger than the threshold value T, the sending power of the channel is corrected on the basis of the sending power of the determined channel. However, the present invention is not limited thereto and the same effect as the aforementioned case can be obtained in the following method. After determining the sending power of the channel having the largest sending power, the sending power ratio is calculated with respect to the adjacent channel adjacent to the determined channel to be compared to the threshold value T. If the sending power ratio is larger than the threshold value T, the sending power of the adjacent channel is corrected on the basis of the sending power of the determined channel.

Figure 15:
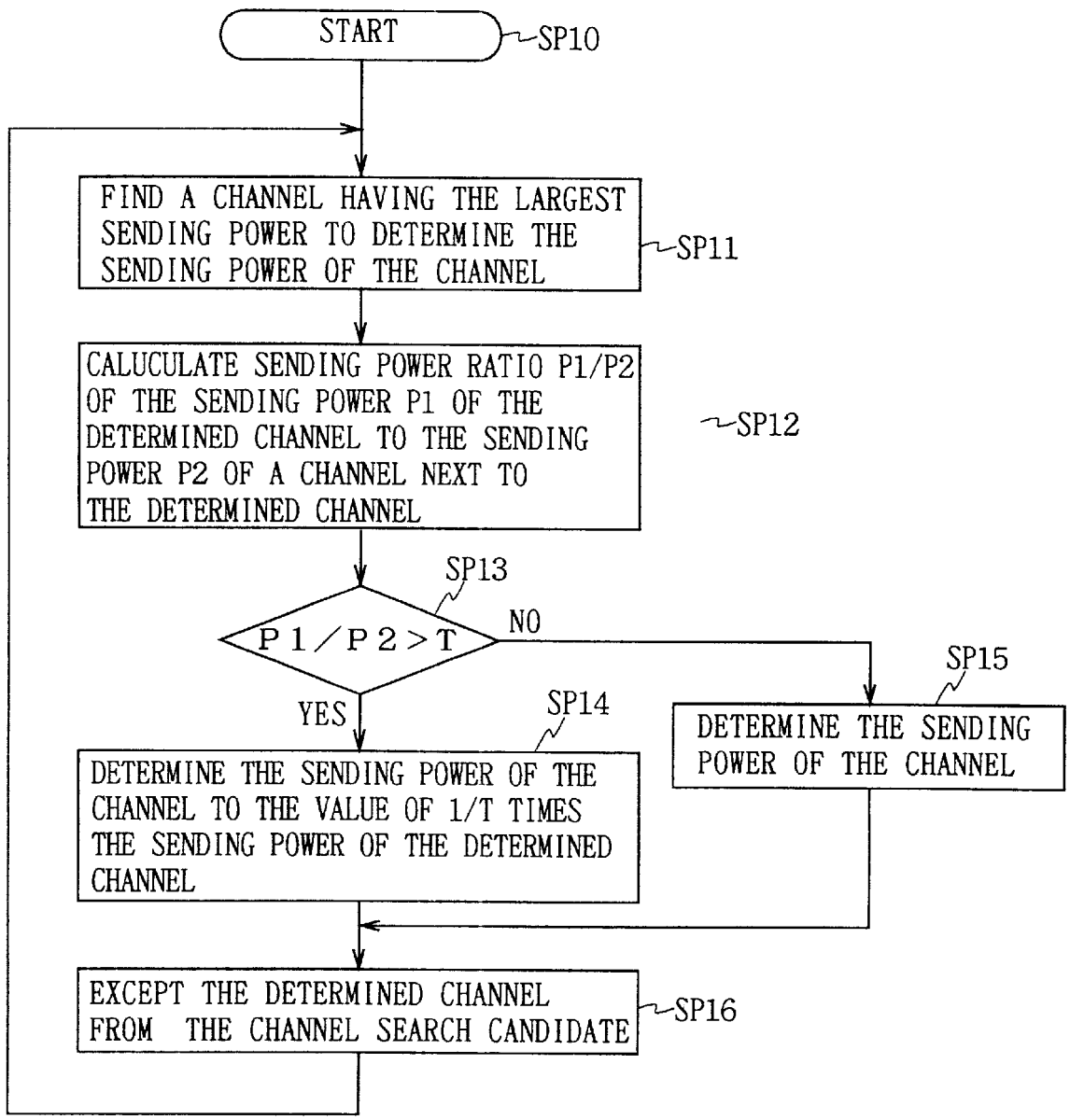
FIG. 15 is a flow chart showing the power correction processing according to the other embodiment.

Here, the power correcting process of this case is shown in FIG. 15. As shown in FIG. 15, the electric-power correcting circuit 40 enters from the step SP10. At the following step SP11, the circuit 40 finds a channel having the largest sending power, and determines the sending power of the channel to the sending power set based on the control data. Next, at the step SP12, the electric-power correcting circuit 40 calculates the sending power ratio P1/P2 of the sending power P1 of the determined channel having the determined sending power to the sending power P2 of the channel adjacent to the determined channel. Next, at the step SP13, the electric-power correcting circuit 40 judges whether the calculated sending power ratio P1/P2 is larger than the stated threshold value T or not. If the sending power ratio P1/P2 is smaller than the threshold value T, the circuit 40 goes to the step SP14 to determine the sending power of the channel to the power set based on the control data, and then goes to the step SP16. On the contrary, if the sending power ratio P1/P2 is larger than the threshold value T as the result of the comparison, the electric-power correcting circuit 40 determines the sending power of the channel to the value of 1/T times the sending power P1 of the adjacent determined channel, and goes to the step SP16. At the following step SP16, the electric-power correcting circuit 40 excepts these determined channels from the channel search candidate, and then it returns to the step SP11 again to repeats the processing.

In this way, with respect to the channel having the largest sending power among the plural down communication channels A to I, its sending power is determined to the power set based on the control data, and then, with respect to the channel adjacent to the determined channel, the sending power is corrected on the basis of the sending power of the determined channel. Therefore, as with the case mentioned above, it is able to correct the signal-to-interference power ratio C/I of the channel that is greatly suffered from adjacent-channel interference to prevent the signal-to-interference power ratio C/I from deteriorating.

In the above embodiment, the sending power of the channel suffered from adjacent-channel interference is increased. However, the present invention is not limited thereto and the sending power can be decreased in some cases, such as the case of variation of the communication environment.

Further, in the above embodiment, frequency hopping is performed. However, the present invention is not limited thereto and the same effects as the above can be also obtained in the case where frequency hopping is not performed.

In the above embodiment, the present invention is applied to the cellular radio communication system 10 which communicates using multi-carrier system. However, the present invention is not limited thereto and the same effects as the above can be also obtained in the case where the present invention is applied to the cellular radio communication system which communicates using time division multiple access (TDMA) system. In brief, the same effects as the above can be also obtained in the case of radio communication system wherein plural channels are formed in the frequency direction, and a transmission signal having the previously set sending power is transmitted through the plural channels.

As described above, according to the present invention, in the case of performing transmission with the previously set sending power, the transmission is performed with the set sending power with respect to a channel having the largest sending power. With respect to a channel having the next larger sending power, if any determined channel is adjacent to the channel, its sending power is corrected on the basis of the sending power of the determined channel to transmit. Thus, it is able to prevent the influence of adjacent-channel interference to achieve communication satisfactory.

In addition, in the case of performing transmission with the previously set sending power, the transmission is performed with the set sending power with respect to a channel having the largest sending power. With respect to a channel adjacent to the determined channel having the determined sending power, its sending power is corrected on the basis of the sending power of the determined channel to perform transmission. Thus, it is able to prevent the influence of adjacent-channel interference to achieve communication satisfactory.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitting method, comprising the steps of:
forming plural channels in a frequency direction; and
transmitting transmission signals via the plural channels with a previously set sending power,
wherein, with respect to a determined channel having a largest sending power for said transmission signals among said plural channels, the sending power of said determined channel is determined to be set to said previously set sending power to perform transmission and, with respect to a noticed channel having a next largest sending power for said transmission signals, if the determined channel having said sending power determined exists adjacent to the noticed channel, said previously set sending power is corrected based on the sending power of the determined channel to perform the transmission.

2. The transmitting method according to claim 1, wherein at a time of correcting said sending power, it is judged whether a correction is performed based on a power ratio of the sending power of said determined channel to said sending power previously set to said noticed channel.

3. The transmitting method according to claim 2, wherein if said power ratio is larger than a stated threshold value, said sending power previously set to said noticed channel is corrected and, if said power ratio is smaller than said stated threshold value, the sending power of said noticed channel is determined to be set to said previously set sending power.

4. The transmitting method according to claim 3, wherein at a time of correcting said sending power, the correction is performed by one of increasing and lowering said previously set sending power.

5. A transmitting method, comprising the steps of:
forming plural channels in a frequency direction; and
transmitting transmission signals via the plural channels with a previously set sending power,
wherein, with respect to a determined channel having a largest sending power for said transmission signals among said plural channels, the sending power is determined to be set to said previously set sending power to perform transmission and, with respect to a channel adjacent to said determined channel having said sending power determined, said previously set sending power is corrected based on the sending power of the determined channel.

6. The transmitting method according to claim 5, wherein at a time of correcting said sending power, it is judged whether a correction is performed based on a power ratio of the sending power of said determined channel to said sending power previously set to said adjacent channel.

7. The transmitting method according to claim 6, wherein if said power ratio is larger than a stated threshold value, said sending power previously set to said adjacent channel is corrected and, if said power ratio is smaller than said stated threshold value, the sending power of said adjacent channel is determined to be set to said previously set sending power.

8. The transmitting method according to claim 7, wherein at a time of correcting said sending power, the correction is performed by one of increasing and lowering said previously set sending power.

9. A transmitting method, comprising the steps of:
forming plural channels in a frequency direction; and
transmitting transmission signals based on multi-carriers, on plural channels with a previously set sending power,
wherein, with respect to a determined channel having a largest sending power for said transmission signals among said plural channels, the sending power is determined to be set to said previously set sending power to perform transmission and, with respect to a noticed channel having a next largest sending power for said transmission signals, if the determined channel having said sending power determined exists adjacent to the noticed channel, said previously set sending power is corrected based on the sending power of the determined channel to perform the transmission.

10. The transmitting method according to claim 9, wherein
at a time of correcting said sending power, it is judged whether a correction is performed based on a power ratio of the sending power of said determined channel to said sending power previously set to said noticed channel.

11. The transmitting method according to claim 10, wherein
if said power ratio is larger than a stated threshold value, said sending power previously set to said noticed channel is corrected and, if said power ratio is smaller than said stated threshold value, the sending power of said noticed channel is determined to be set to said previously set sending power.

12. The transmitting method according to claim 11, wherein
at a time of correcting said sending power, the correction is performed by one of increasing and lowering said previously set sending power.

13. A transmitting method, comprising the steps of:
forming plural channels in a frequency direction; and
transmitting transmission signals based on multi-carriers on the plural channels with a previously set sending power,
wherein, with respect to a determined channel having a largest sending power for said transmission signals among said plural channels, the sending power is determined to be set to said previously set sending power to perform transmission and, with respect to a channel adjacent to said determined channel having the sending power determined, said previously set sending power is corrected based on the sending power of the determined channel to perform the transmission.

14. The transmitting method according to claim 13, wherein
at the time of correcting said sending power, it is judged whether a correction is performed, based on a power ratio of the sending power of said determined channel to said sending power previously set to said adjacent channel.

15. The transmitting method according to claim 14, wherein
if said power ratio is larger than a stated threshold value, said sending power previously set to said adjacent channel is corrected and, if said power ratio is smaller than said stated threshold value, the sending power of said adjacent channel is determined to be set to said previously set sending power.

16. The transmitting method according to claim 15, wherein
at a time of correcting said sending power, the correction is performed by one of increasing and lowering said previously set sending power.

17. A transmitting method, comprising the steps of:
forming plural channels in a frequency direction; and
transmitting transmission signals based on time division, on the plural channels with a previously set sending power,
wherein, with respect to a determined channel having a largest sending power for said transmission signals among said plural channels, the sending power is determined to be set to said previously set sending power to perform transmission and, with respect to a noticed channel having a next larger sending power for said transmission signal, if said determined channel having the sending power determined exists adjacent to the noticed channel, said previously set sending power is corrected based on the sending power of the determined channel to perform the transmission.

18. The transmitting method according to claim 17, wherein
at a time of correcting said sending power, it is judged whether a correction is performed, based on a power ratio of the sending power of said determined channel to said sending power previously set to said noticed channel.

19. The transmitting method according to claim 18, wherein
if said power ratio is larger than a stated threshold value, said sending power previously set to said noticed channel is corrected and, if said power ratio is smaller than said threshold value, the sending power of said noticed channel is determined to be set to said previously set sending power.

20. The transmitting method according to claim 19, wherein
at a time of correcting said sending power, the correction is performed by one of increasing and lowering said previously set sending power.

21. A transmitting method, comprising the steps of:
forming plural channels in a frequency direction; and
transmitting transmission signals based on time division on the plural channels with a previously set sending power,
wherein, with respect to a determined channel having a largest sending power for said transmission signal among said plural channels, the sending power is determined to be set to said previously set sending power to perform transmission and, with respect to a channel adjacent to said determined channel having the sending power determined, said previously set sending power is corrected based on the sending power of the determined channel to perform the transmission.

22. The transmitting method according to claim 21, wherein
at a time of correcting said sending power, it is judged whether a correction is performed based on a power ratio of the sending power of said determined channel to said sending power previously set to said adjacent channel.

23. The transmitting method according to claim 22, wherein
if said power ratio is larger than a stated threshold value, said sending power previously set to said adjacent channel is corrected and, if said power ratio is smaller than said stated threshold value, the sending power of said adjacent channel is determined to be set to said previously set sending power.

24. The transmitting method according to claim 23, wherein at a time of correcting said sending power, the correction is performed by one of increasing and lowering said previously set sending power.

25. A sending power controlling method in a transmitting apparatus, comprising the steps of:

forming plural channels in a frequency direction; and transmitting transmission signals via the plural channels with sending power set based on power controlling data delivered from communication terminal units, wherein, with respect to a determined channel having a largest sending power for said transmission signal among said plural channels, the sending power is determined to be set to said sending power set and, with respect to a noticed channel having a next larger sending power for said transmission signals, if said determined channel having the sending power determined exists adjacent to the noticed channel, said sending power set is corrected based on the sending power of the determined channel.

26. The sending power controlling method according to claim 25, wherein at a time of correcting said sending power, it is judged whether a correction is performed based on a power ratio of the sending power of said determined channel to said sending power set to said noticed channel.

27. The sending power controlling method according to claim 26, wherein if said power ratio is larger than a stated threshold value, said sending power set to said noticed channel is corrected and, if said power ratio is smaller than said threshold value, the sending power of said noticed channel is determined to be set to said set sending power.

28. The sending power controlling method according to claim 27, wherein at a time of correcting said sending power, the correction is performed by one of increasing and lowering said set sending power.

29. A sending power controlling method in a transmitting apparatus, comprising the steps of:

forming plural channels in a frequency direction; and transmitting transmission signals on the plural channels with sending power set based on power controlling data delivered from communication terminal units, wherein, with respect to a determined channel having a largest sending power of said transmission signal among said plural channels, the sending power is determined to be set to said sending power set and, with respect to a channel adjacent to said determined channel having the sending power determined, said set sending power is corrected based on the sending power of the determined channel.

30. The sending power controlling method according to claim 29, wherein at a time of correcting said sending power, it is judged whether a correction is performed based on a power ratio of the sending power of said determined channel to said sending power set to said adjacent channel.

31. The sending power controlling method according to claim 30, wherein if said power ratio is larger than a stated threshold value, said sending power set to said adjacent channel is corrected and, if said power ratio is smaller than said stated threshold value, the sending power of said adjacent channel is determined to be set to said set sending power.

32. The sending power controlling method according to claim 31, wherein at a time of correcting said sending power, the correction is performed by one of increasing and lowering said set sending power.

33. A transmitting apparatus for forming plural channels in a frequency direction and for transmitting transmission signals on the plural channels with sending power set based on power controlling data delivered from communication terminal units, said transmitting apparatus comprising:

receiving means for receiving said power controlling data delivered from said communication terminal units;

controlling means for setting the sending power of said transmission signals based on said power controlling data;

transmitting means for transmitting said transmission signals; and power correcting means for determining to set the sending power to said set sending power with respect to a determined channel having a largest sending power for said transmission signals among said plural channels and, with respect to a noticed channel having a next larger sending power for said transmission signals, if said determined channel having the sending power determined exists adjacent to the noticed channel, for correcting said set sending power based on the sending power of the determined channel.

34. The transmitting apparatus according to claim 33, wherein at a time of correcting said sending power, said power correcting means judges whether a correction is performed based on a power ratio of the sending power of said determined channel to said sending power set to said noticed channel.

35. The transmitting apparatus according to claim 34, wherein if said power ratio is larger than a stated threshold value, said power correcting means corrects said sending power set to said noticed channel and, if said power ratio is smaller than said stated threshold value, said power correcting means determines to set the sending power of said noticed channel to said set sending power.

36. The transmitting apparatus according to claim 35, wherein at a time of correcting said sending power, said power correcting means performs the correction by one of increasing and lowering said set sending power.

37. A transmitting apparatus for forming plural channels in a frequency direction and for transmitting transmission signals via the plural channels with sending power set based on power controlling data delivered from communication terminal units, said transmitting apparatus comprising:

receiving means for receiving said power controlling data delivered from said communication terminal units;

controlling means for setting the sending power of said transmission signals based on said power controlling data;

transmitting means for transmitting said transmission signals; and power correcting means for determining to set the sending power to said set sending power with respect to a determined channel having a largest sending power for said transmission signals among said plural channels and, with respect to a channel adjacent to said determined channel having the sending power determined, for correcting said set sending power based on the sending power of the determined channel.

38. The transmitting apparatus according to claim 37, wherein at a time of correcting said sending power, said power correcting means judges whether the correction is performed based on a power ratio of the sending power of said determined channel to said sending power set to said adjacent channel.

39. The transmitting apparatus according to claim 38, wherein if said power ratio is larger than the stated threshold value, said power correcting means corrects said sending power set to said adjacent channel and, if said power ratio is smaller than said stated threshold value, said power correcting means determines to set the sending power of said adjacent channel to said set sending power.

40. The transmitting apparatus according to claim 39, wherein at a time of correcting said sending power, said power correcting means performs the correction by one of increasing and lowering said set sending power.

* * * * *